Earl V. Wise, Sr. INVENTOR.

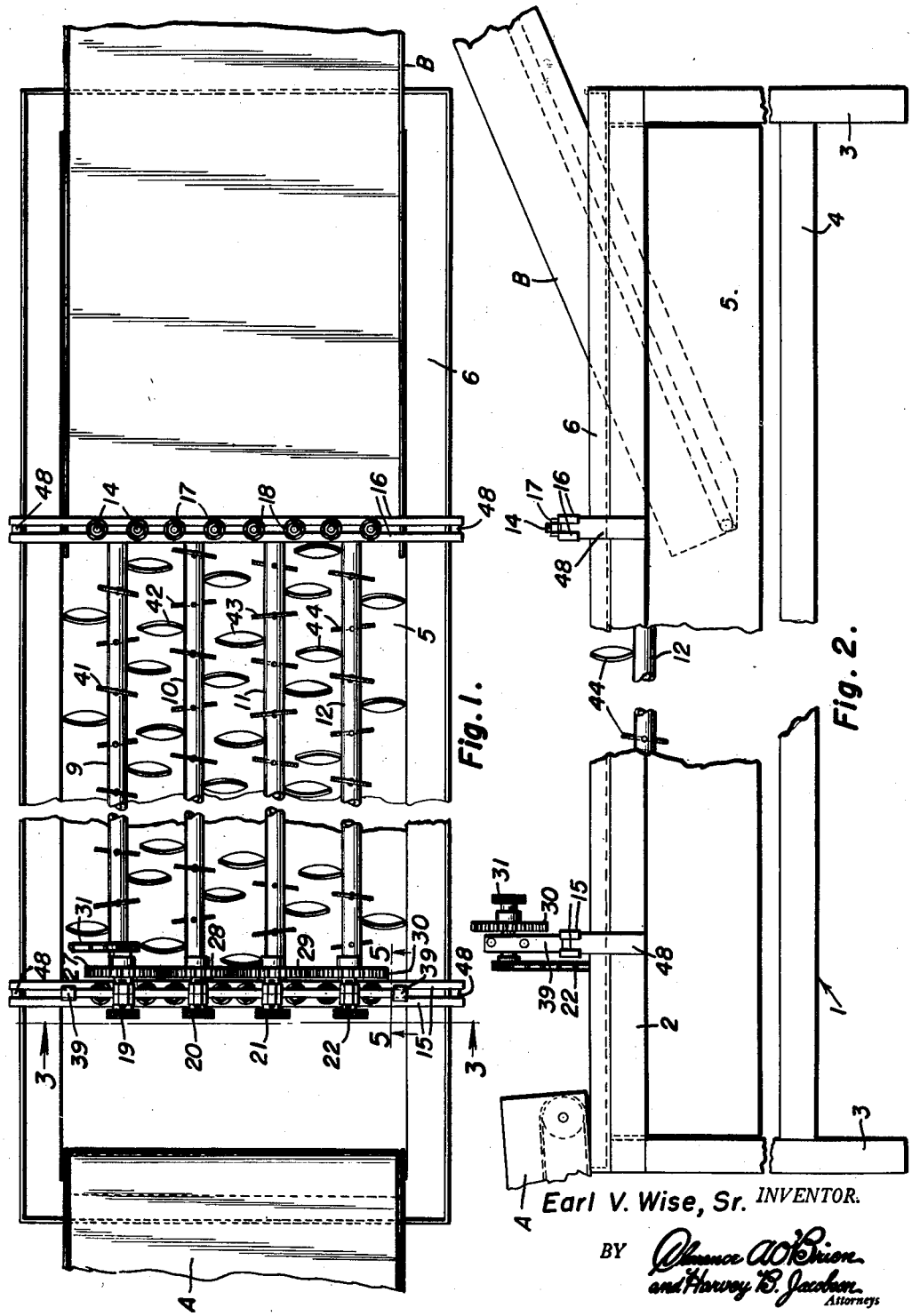

Patented Apr. 7, 1953

2,633,793

UNITED STATES PATENT OFFICE 2,633,793

APPARATUS FOR TREATING POTATO CHIPS DURING COOKING

Earl V. Wise, Sr., Berwick, Pa., assignor to Wise Potato Chip Company, Berwick, Pa., a corporation of Pennsylvania Application August 23, 1948, Serial No. 45,654

4 Claims. (Cl. 99—405)

My invention relates to improvements in apparatus for treating potato chips during cooking in deep fat, cooking oil, or other cooking liquid.

The primary object of my invention is to provide for keeping potato chips continuously submerged, substantially, and moving in cooking liquid and in a manner such that the same are thoroughly and uniformly cooked, particularly in large quantities.

Another object is to provide rotary apparatus for use in a cooking vat to propel potato chips in a cooking liquid from a source of supply to a discharge means while keeping the potato chips submerged and travelling in a tortuous path so that the course of travel of the potato chips is definitely longer than the distance between the supply source and discharge means, and whereby the potato chips are thoroughly cooked between limits of travel thereof as determined by the length of the vat, or the distance between the supply source and discharge means.

Another object is to provide apparatus of the rotary type for accomplishing the above which is of simple form, inexpensive construction, and easy to service, install, and maintain clean.

Other and subordinate objects, within the purview of my invention, together with the precise nature of my improvements will be readily understood when the succeeding description and claims are read with reference to the drawings accompanying and forming part of this specification.

In the said drawings:

Figure 1 is a view in plan, partly broken away, of a preferred embodiment of my improved apparatus for practicing my invention;

Figure 2 is a view in side elevation partly broken away;

Figure 3:
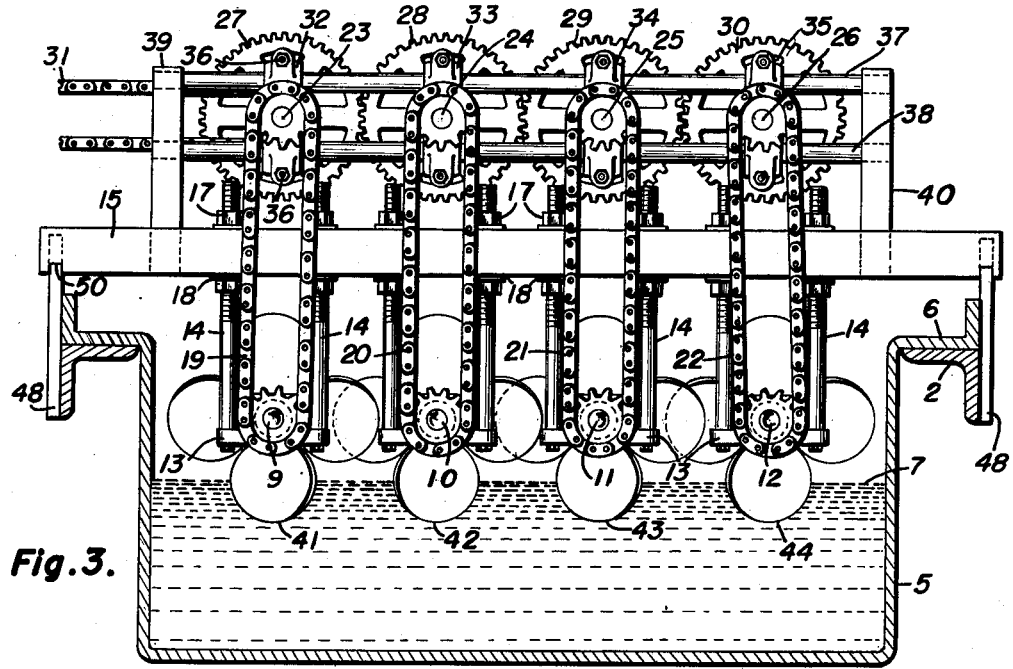
Figure 3 is a view in vertical transverse section taken on the line 3—3 of Figure 1 and drawn to a larger scale.
Figure 4:
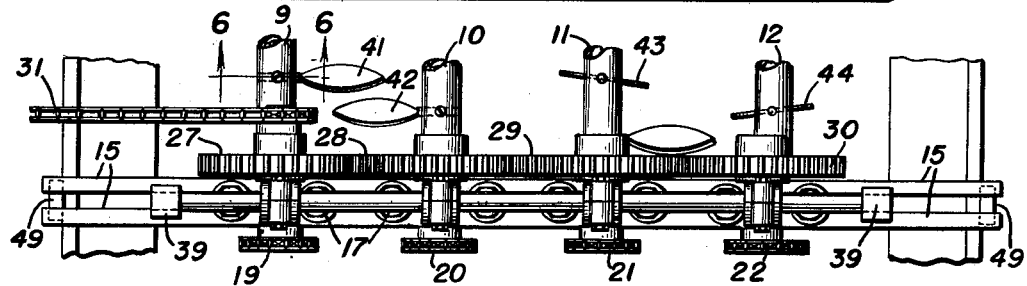
Figure 4 is a fragmentary view in plan.
Figure 5:
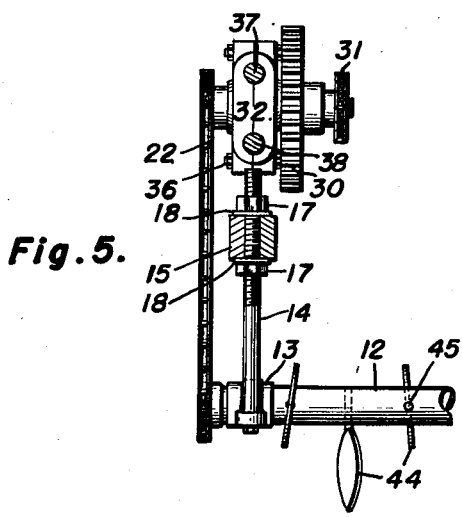
Figure 5 is a fragmentary view in vertical transverse section taken on the line 5—5 of Figure 1 and drawn to a larger scale.
Figure 6:
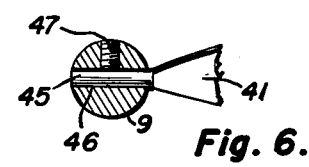
Figure 6 is a detail view in transverse section taken on the line 6—6 of Figure 4 and drawn to a larger scale.

Referring to the drawings by numerals, the apparatus of my invention includes a skeleton vat supporting structure 1 comprising, in the embodiment shown, a rectangular top frame 2 with end legs, as at 3, suitably connected by horizontal bars, as at 4.

The supporting structure 1 is designed to support a cooking vat 5 which, in the embodiment shown, is of elongated rectangular form and fitted in the top frame 2 with a rim flange 6 resting on said frame. The cooking vat 5 is designed to be positioned over any suitable heating means, not shown, for heating cooking liquid 7 for cooking of the potato chips, not shown, therein.

A potato chip supply conveyor A extends over one end of the vat 5, hereinafter referred to as the supply end, and for a distance suitable for supplying raw potato chips in said end of the vat. The supply conveyor A may be driven in any suitable manner.

A potato chip discharge conveyor B inclines upwardly out of the other end of the vat 5 for picking up the cooked potato chips out of the cooking liquid 7 and conveying the same out of the vat. The discharge conveyor B may also be driven in any suitable manner.

Intermediate the supply and discharge conveyors A, B, means are provided for propelling and submerging the potato chips and which comprises the following.

A plurality of laterally spaced, propeller shafts are suspended in the vat 5 in parallel relation and to extend longitudinally of said vat between the conveyors A, B above the cooking liquid 7, said shafts forming side by side pairs designated 9, 10 in one pair, and 11, 12 in the other pair, the shafts being equi-distantly spaced apart in a horizontal plane with the pairs upon opposite sides of the longitudinal center of the vat 5.

End journal bearings, such as shown at 13, support the propeller shafts 9, 10, 11, 12 and which are suspended by pairs of threaded vertical hanger rods, as at 14, interposed and fitted between front and rear pairs of spaced apart, horizontal bars 15, 16 extending across the vat 5 and supported by means presently described. Clamping nuts 17 and washers 18 on the hanger rods 14 above and below the pairs of bars 15, 16 provide for securing said hanger rods 14 to said bars 15, 16 in different vertically adjusted positions to adjust the propeller shafts 9, 10, 11, 12 vertically, said nuts 17 and washers 18 also providing for adjusting the pairs of hanger rods 14 along the pairs of bars 15, 16 to adjust the propeller shafts 9, 10, 11, 12 laterally, all as occasion may require.

A drive for the propeller shafts 9, 10, 11, 12 is provided comprising sprocket and chain connections 19, 20, 21, 22 between the front ends of said shafts and overhead stub shafts 23, 24, 25, 26 vertically aligned and parallel with said propeller shafts respectively. Like meshing gears 27, 28, 29, 30 fast on the stub shafts 23, 24, 25, 26 connect said shafts together whereby the propeller shafts 9, 10, 11, 12 are rotated in opposite directions in each pair, relatively, as indicated by the arrows in Figure 3. A sprocket and chain drive 31 extends from a suitable source of power to one of the stub shafts, for instance shaft 23.

Mountings are provided for the stub shafts 23, 24, 25, 26 comprising bearings 32, 33, 34, 35 of the split type clamped by bolts 36 to a pair of vertically spaced horizontal rods 37, 38 above and parallel with the front pair of bars 15 and having ends suitably fixed in a pair of vertical posts 39, 40 having lower ends interposed between the pair of bars 15 and suitably fixed thereto to secure said bars 15 together in spaced apart relation.

Returning now to the propeller shafts, said shafts 9, 10, 11, 12 are provided respectively with a series of disc-like propeller blades 41, 42, 43, 44 spaced apart equi-distantly along the shaft in spiral formation and in 90° angular relation and pitched to propel potato chips in the liquid 7 from the supply end of the vat 5 to the discharge conveyor B when such shafts are rotated in the direction above described. As will be seen, the propeller blades 41, 42, 43, 44 revolve in interlapping relation intermediate the pairs of propeller shafts; which is to say intermediate said shafts and form pairs of complemental series revolving oppositely in each pair, relatively, with the propeller blades revolving upwardly in each pair between the series of the pair.

The propeller blades 41, 42, 43, 44 are each provided with a shank, as at 45, rotatably fitted in a bore 46 in the propeller shaft and clamped therein by a set screw 47, whereby said blades may be adjusted to vary the pitch thereof if desired. The outer series of propeller blades 41, 44 run close to the sides of the vat 5 for obvious reasons, and all of the propeller blades dip part way into the liquid 7 a distance which may be varied by vertical adjustment of the propeller shafts 9, 10, 11, 12 in the manner previously described. Of course, in vertically adjusting the propeller shafts 9, 10, 11, 12, the sprocket and chain connections 19 to 22 must be lengthened or shortened by adding or removing links in the chains.

The propelling and submerging means described in the foregoing forms a unit mounted over the vat 5 in suspended position for removal and replacement, at will, and so that the vat 5 may be removed out of the frame 2, cleaned and then replaced. The mounting comprises uprights 48 on the frame 2 with reduced upper ends 49 straddled by the pairs of bars 15, 16, the ends of which are supported on said uprights. Bottom edge notches 50 in said bars 15, 16 fit over the uprights 48 and thus prevent endwise movement of said bars 15, 16 and sidewise shifting of the unit. As will now be seen, the described propelling and submerging means is adapted to be lifted, as a unit, off the uprights 48 and out of the vat 5 for cleaning or repair purposes.

Referring now to the operation of the apparatus, with the propeller blades 41, 42, 43, 44 revolving, as described in the foregoing, potato chips, not shown, floating in the liquid 7 will be positively propelled from the supply end of the vat 5 onto the discharge conveyor B to be conveyed out of the vat 5. Because the series of propeller blades in the complemental pairs revolve oppositely, in the directions specified, as the propeller blades enter the liquid 7, the same forcibly submerge potato chips therein and then shove the same forwardly. However, the propeller blades of complemental series, that is blades 41, 42 on the one hand, and blades 43, 44 on the other hand, urge and propel the potato chips forwardly diagonally in opposite directions cross-wise of the vat 5 resulting in the potato chips being propelled forwardly in tortuous substantially criss-cross courses, whereby the potato chips are thoroughly submerged and cooked between the source of supply and the discharge means. As the propeller blades 41, 42, 43, 44 start revolving upwardly out of the liquid 7, they tend to tumble the potato chips upwardly in the liquid 7 thereby further assuring that the potato chips are properly subjected to the cooking action of the liquid 7. Thus the potato chips are cooked evenly and thoroughly and a high quality product attained. The speed with which the potato chips travel through their course, or courses, may be varied by varying the speed of the drive and the pitch of the propeller blades 41, 42, 43, 44.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

Having described the invention, what is claimed as new is:

1. Apparatus for treating potato chips during cooking comprising a vat for containing cooking liquid, a plurality of rotary propeller shafts with helically arranged series of propeller blades thereon, means suspending said shafts in said vat horizontally side by side to revolve said blades into and out of the liquid comprising uprights at the sides of the vat, pairs of horizontal bars extending across said vat with ends resting on said uprights for lifting off the same and with said bars secured together in spaced apart relation in each pair, pairs of hanger rods for said shafts depending from said pairs of bars for lifting therewith and laterally and vertically adjustable between the bars of said pairs to correspondingly adjust said shafts, and means to drive said shafts in unison mounted on one pair of bars for lifting therewith in operative connection with said shafts.

2. Apparatus for treating potato chips during cooking comprising a vat for containing cooking liquid, a plurality of rotary propeller shafts with helically arranged series of propeller blades thereon, means suspending said shafts in said vat horizontally side by side to revolve said blades into and out of the liquid comprising uprights at the sides of the vat, pairs of horizontal bars extending across said vat with ends resting on said uprights for lifting off the same and with said bars secured together in spaced apart relation in each pair, pairs of hanger rods for said shafts depending from said pairs of bars for lifting therewith and laterally and vertically adjustable between the bars of said pairs to correspondingly adjust said shafts, and means to drive said shafts in unison mounted on one pair of bars for lifting therewith in operative connection with said shafts, comprising individual sprocket and chain drives for said shafts.

3. Apparatus for treating potato chips during cooking comprising a vat for containing cooking liquid, a plurality of rotary propeller shafts with helically arranged series of propeller blades thereon, means suspending said shafts in said vat horizontally side by side to revolve said blades into and out of the liquid comprising uprights at the sides of the vat, pairs of horizontal bars extending across said vat with ends resting on said uprights for lifting off the same and with said bars secured together in spaced apart relation in each pair, pairs of hanger rods for said shafts depending from said pairs of bars for lifting therewith and laterally and vertically adjustable between the bars of said pairs, to correspondingly adjust said shafts, and means to drive said shafts in unison mounted on one pair of bars for lifting therewith in operative connection with said shafts, comprising stub shafts for driving said propeller shafts respectively, gearing between said stub shafts, and sprocket and chain connections between said stub shafts and propeller shafts.

4. Apparatus for treating potato chips during cooking comprising a vat for containing cooking liquid, a plurality of rotary propeller shafts with helically arranged series of propeller blades thereon, means suspending said shafts in said vat horizontally side by side to revolve said blades into and out of the liquid comprising uprights at the sides of the vat, pairs of horizontal bars extending across said vat with ends resting on said uprights for lifting off the same and with said bars secured together in spaced apart relation in each pair, pairs of hanger rods for said shafts depending from said pairs of bars for lifting therewith and laterally and vertically adjustable between the bars of said pairs to correspondingly adjust said shafts, and means to drive said shafts in unison mounted on one pair of bars for lifting therewith in operative connection with said shafts comprising stub shafts for driving said propeller shafts respectively, gearing between said stub shafts, and sprocket and chain connections between said stub shafts and propeller shafts, said gearing providing for rotation of alternate propeller shafts oppositely relative to intermediate propeller shafts to correspondingly revolve the series of propeller blades.

EARL V. WISE, Sr.

REFERENCES CITED

The following references are of record in the file of this patent:

UNITED STATES PATENTS

| Number | Name | Date |
|---|---|---|
| 534,968 | Pfeiderer | Feb. 26, 1895 |
| 539,288 | McLennan | May 14, 1895 |
| 690,506 | Wurster | Jan. 7, 1902 |
| 2,074,044 | Bushway | Mar. 16, 1937 |
| 2,085,494 | Ferry | June 29, 1937 |
| 2,101,506 | Morrow et al. | Dec. 7, 1937 |
| 2,170,775 | Ferry | Aug. 22, 1939 |
| 2,174,556 | Ferry | Oct. 3, 1939 |
| 2,176,624 | Ferry | Oct. 17, 1939 |
| 2,498,237 | Raymond | Feb. 21, 1950 |
| 2,552,441 | McBeth | May 8, 1951 |